United States Patent [19]

Brumm

[11] 4,050,669

[45] Sept. 27, 1977

[54] EXPANSIBLE TUBE VALVES

[75] Inventor: Richard S. Brumm, Orinda, Calif.

[73] Assignee: Grove Valve and Regulator Company, Oakland, Calif.

[21] Appl. No.: 637,820

[22] Filed: Dec. 4, 1975

[51] Int. Cl.² ............................................. F16L 55/14
[52] U.S. Cl. ........................................ 251/5; 251/61.1
[58] Field of Search ...................... 137/515, 515.7, 525; 251/61, 61.1, 5

[56] References Cited

U.S. PATENT DOCUMENTS

| | | | |
|---|---|---|---|
| 2,331,291 | 10/1943 | Annin | 251/5 |
| 2,353,143 | 7/1944 | Bryant | 251/61 |
| 2,360,873 | 10/1944 | Grove | 251/5 |
| 2,621,889 | 12/1952 | Annin | 251/5 |
| 2,747,608 | 5/1956 | Grove | 137/525 |
| 3,582,037 | 6/1971 | Levesgue | 251/61.1 |
| 3,836,113 | 9/1974 | Johnson | 251/61.1 |

Primary Examiner—Martin P. Schwadron
Assistant Examiner—G. L. Walton
Attorney, Agent, or Firm—Melvin R. Stidham

[57] ABSTRACT

A valve wherein an expansible tube is stretched around a hollow core, which has a central barrier between inlet and outlet slots around the core. An annular groove is formed around the outer sealing surface of the barrier and extensions of some of the downstream slots open into the groove to vent the groove and produce a pressure drop across the expansible tube to enhance sealing and to provide an initial flow path when the tube is forced away from the sealing surface.

2 Claims, 4 Drawing Figures

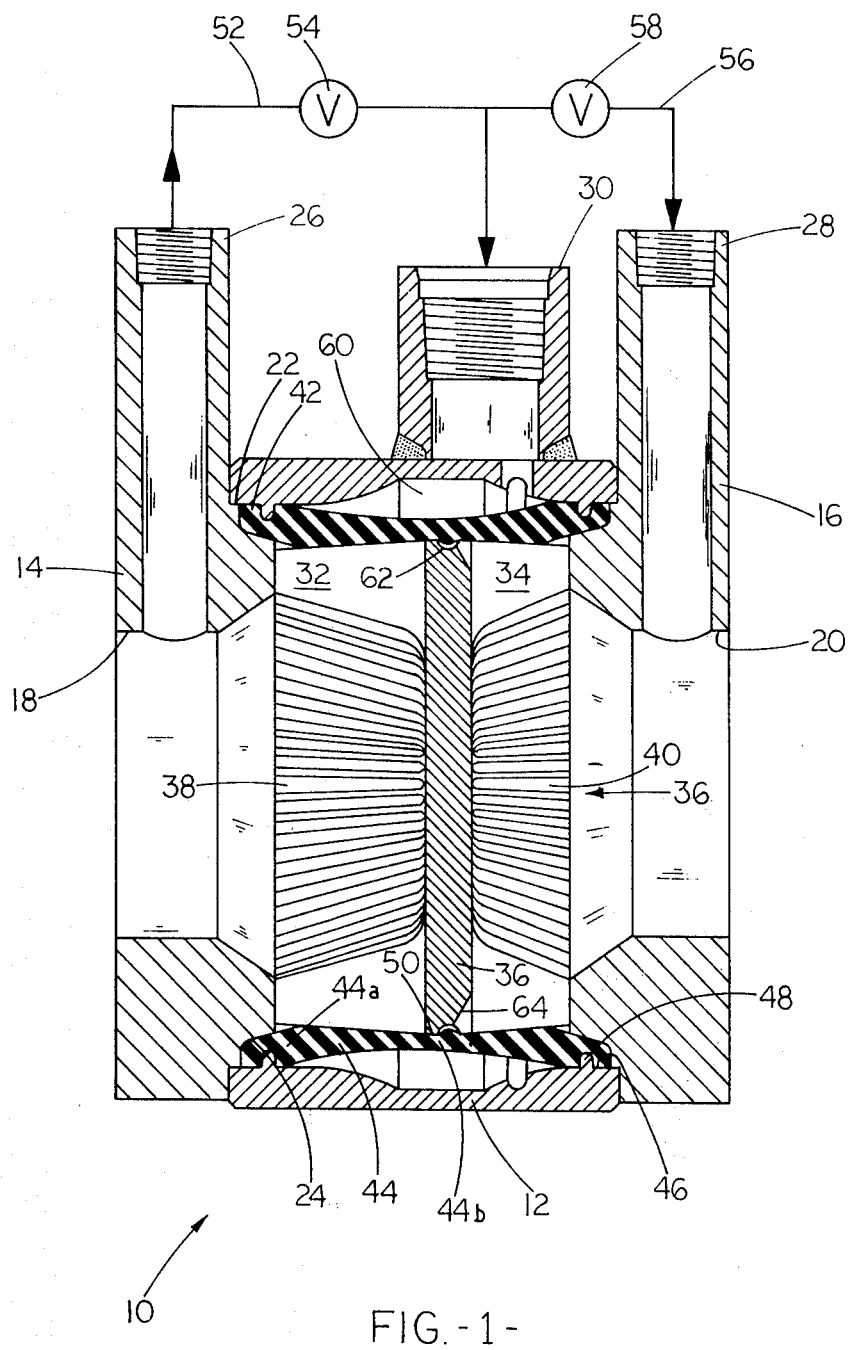
FIG.-1-

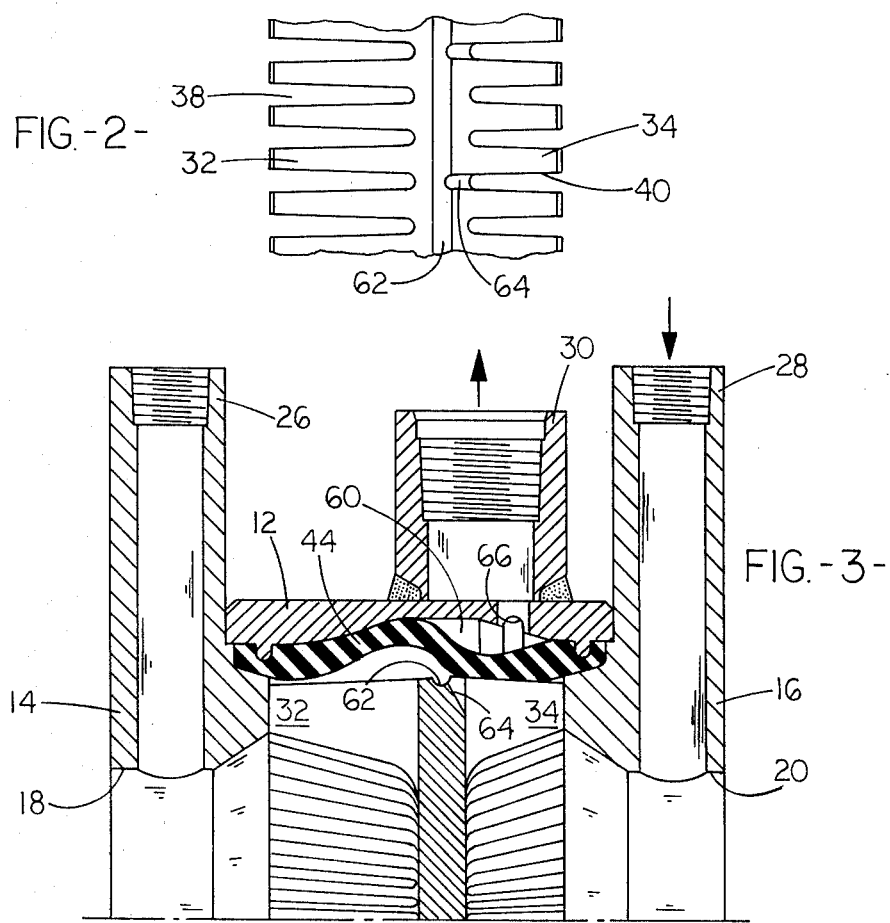
FIG.-2-
FIG.-3-
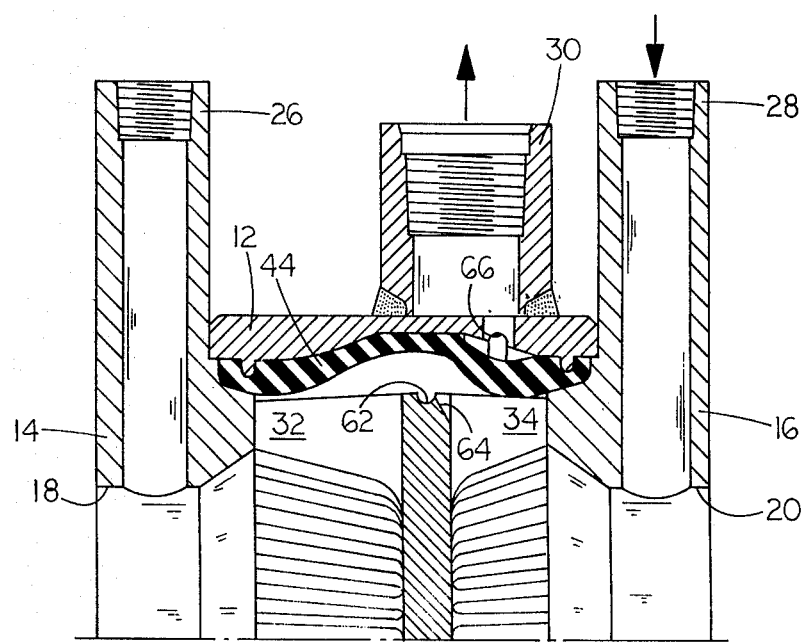
FIG.-4-

EXPANSIBLE TUBE VALVES

BACKGROUND OF THE INVENTION

Expansible tube valves of the type shown in U.S. Pat. Nos. 3,272,470 and 3,306,569 have proven very effective, particularly in pressure regulation service. Such valves include a slotted core with a barrier across it between inlet and outlet flow slots. An expansible tube is stretched to seal around the barrier, normally to isolate the inlet and outlet slots. The core and expansible tube are carried within a housing, with a jacket fluid pressure normally asserted around and against the outer surface of the expansible tube to constrict it against the outer sealing surface of the barrier. Commonly, the jacket is pressurized from the upstream line whereby the pressure around the expansible tube and that asserted against the interior through the upstream slots are in balance. Consequently, sealing is effected largely through the stretch of the expansible tube around the barrier sealing surface. This requires a highly finished sealing surface as well as appreciable stretch, to insure against leak paths. Then, when the jacket pressure is reduced and is overcome by the upstream pressure the expansible tube tends to snap open with a sudden outward stretch which leads to over-action and less than completely stable operation.

OBJECTS OF THE INVENTION

It is an object of this invention to provide an expansible tube valve with means for enhancing the sealing action.

It is a further object of this invention to provide an expansible tube valve with sharper sealing surfaces to concentrate sealing forces.

It is a further object of this invention to provide an expansible tube valve which requires relatively little stretch in order to effect a tight seal when in closed condition.

It is a further object of this invention to provide an expansible tube valve with means to enable a smoother opening when jacket pressure is overcome.

Other objects of this invention will become apparent from the description to follow, particularly when read in conjunction with the accompanying drawings.

BRIEF SUMMARY OF INVENTION

In carrying out this invention, there is provided a cylindrical core having a central carrier across it and two annular series of inlet and outlet slots, enabling fluid flow around the barrier. A flexible, expansible tube is stretched around the core to seal around the outer sealing surface of the barrier. The core and expansible tube are carried in a housing wherein a jacket pressure acts around the outside of the tube to constrict it around the core. Commonly, the jacket pressure is at the pressure of the upstream line whereby sealing is dependent largely upon the hoop tension in the tube. In this invention, the sealing is enhanced by cutting a groove around the sealing surface to provide two relatively sharp annular edges around which the tube is stretched, thus concentrating sealing forces. Then extensions of some of the outlet or downstream slots are cut into the barrier to communicate with the annular groove. This functions to vent the annular groove to the downstream side, producing a pressure drop across the tube to augment the hoop tension, thus reducing the amount of stretch required to effect the seal. These slot extensions taper inward to maximum depth at the downstream side of the barrier to provide a gradually increasing flow path as the expansible tube is moved away from the barrier sealing surface. This provides a smooth, gradual opening.

BRIEF SUMMARY OF THE DRAWING

In the drawing:
FIG. 1 is a vertical section view of an expansible tube valve embodying features of this invention;
FIG. 2 is a partial top view of the core; and
FIGS. 3 and 4 are partial section views of the expansible tube valve in progressive stages of operation.

DESCRIPTION OF A PREFERRED EMBODIMENT

The flexible tube valve 10 of this invention comprises an outer, generally cylindrical body tube 12 which may be clamped by any suitable means (not shown) between upstream and downstream end closures 14 and 16 having inlet 18 and outlet 20 flow passageways therethrough. The end closures 14 and 16 preferrably have shoulders 22 on which the body tube 12 is seated and have circular bosses 24 protruding axially inward. Carried on the end closures 14 and 16, as by casting them integrally therewith are jacket loading and unloading ducts, 26 and 28 respectively. Similarly, a jacket charging and dumping duct 30 is carried on the body tube 12.

Axially extending fingers 32 and 34 of the core 36 may be integrally formed with a central dam or barrier 36 and are circumferentially spaced to form inflow 38 and outflow 40 slots therebetween. The fingers are clamped between the end closures 14 and 16 for stability. Stretched over and around the central barrier with its beaded ends 43 carried on the conical surfaces of the end closure bosses 24 is the flexible, expansible tube 44. The beaded ends 42 of the flexible tube 44 are of generally circular cross-section in the nature of integral O-rings which seal between the bosses 24 and the inner surface 46 of the body tube 12. Annular ridges 48 around the inner surface 46 of the body tube retain the sealing beads 42 in place, and from such O-ring portions 42 the flexible tube 44 enlarges to maximum thicknesses 44a and then reduces to minimum thickness at the central portion 44b wherein it seals against the barrier sealing surface 50. Hence, greater strength is achieved where maximum flexing occurs and the sleeve 44 is more stretchable at the central, sealing portion 44b.

Installed in a pipeline (not shown) a jacket load port 26 (FIG. 1) in the upstream end closure 14 is connected by duct means 52 through a suitable valve 54 to the jacket charge/dumping duct 30, as is the dumping port 28 in the downstream end closure 16, also through a duct 56 with valve 58. In the closed condition of the flexible tube valve 10, the dumping valve 58 is closed and the loading valve 54 is open whereby the pilot jacket 60 is in communication with the upstream passage 18 to equalize the pressure which is acting against the inside of the flexible tube 44 through the upstream slots 38. Accordingly, it was previously necessary to rely upon hoop tension principally in order to effect the seal against the barrier sealing surface 50.

In accordance with this invention, the seal is greatly enhanced by cutting a groove 62 completely around the sealing surface 50 of the barrier 36. This provides two relatively sharp edges against which the sealing pressure is concentrated to minimize leak paths. In additon at least some of the downstream slots 40 are extended, as shown in FIG. 2, by tapered extensions 64 which open into communication with the annular groove 62. Hence, the annular groove is vented to the downstream flow passage, whereby in the sealing condition shown in FIG. 1, there is a pressure drop between the jacket 60 and the downstream line 20 completely around the expansible sleeve 44 to bias the sleeve toward the bottom of the groove. This pressure differential reduces the amount of stretch required to effect a seal.

Referring now to FIGS. 2 and 3, when the pressure in the jacket 60 is reduced by dumping the jacket fluid into the downstream dumping line 56, 28 as indicated by the arrows, the upstream pressure acting through the upstream slots 38 tends to roll the expansible tube 44 away from the core 36. With the venting paths 34, a small amount of flow is initiated as soon as the upstream corner of the groove 62 is uncovered and the flow gradually increases as the tapered slots are further uncovered until the tube reaches a position of substantially full flow, as shown in FIG. 4. This continues, until the jacket 60 is repressurized to the level of the upstream line. A groove 66 around the interior body tube surface, which opens into communication with the charge/dumping duct 30 insures that this recharging pressure acts completely around the expansible tube.

While this invention has been described in conjunction with a preferred embodiment thereof, it is obvious that modifications and changes therein may be made by those skilled in the art without departing from the spirit and scope of this invention, as defined by the claims appended hereto.

What is claimed as invented is:

1. In an expansible tube valve comprising:
   a housing with inlet and outlet flow passageways therein:
   a core of circular cross-section in said housing with opposite open ends thereof aligned with said flow passageways;
   said core having two axially spaced series of inlet and outlet slots therearound;
   a barrier across said core intermediate said inlet and outlet slots having a sealing surface therearound;
   an expansible tube on said core having an intermediate sealing portion normally snugly embracing said sealing surface; and
   a port in said housing for admitting pressure fluid therein against said expansible tube to construct it around said sealing surface;
   the improvement comprising:
   an annular groove with relatively sharp outer side edges extending completely around said sealing surface: and
   venting slots in and around said barrier, from within said annular groove to the downstream side of said barrier communicating with outlet slots;
   said slots tapering from said groove to a greater depth at the downstream surface of said barrier to provide gradually increasing flow passages as said expansible tube expands away from said sealing surface progressively from the upstream thereof.

2. The expansible tube valve defined by claim 1 wherein:
   said expansible tube is of varying thickness decreasing from maximum thicknesses at the ends thereof to a relatively thin sealing portion.